United States Patent
Sheets et al.

(10) Patent No.: US 11,314,966 B2
(45) Date of Patent: Apr. 26, 2022

(54) FACIAL ANTI-SPOOFING METHOD USING VARIANCES IN IMAGE PROPERTIES

(71) Applicant: Visa International Service Association, San Francisco, CA (US)

(72) Inventors: John F. Sheets, San Francisco, CA (US); Sunpreet Singh Arora, San Mateo, CA (US); Lacey Best-Rowden, San Mateo, CA (US); Kim R. Wagner, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 94 days.

(21) Appl. No.: 16/649,571

(22) PCT Filed: Jul. 12, 2018

(86) PCT No.: PCT/US2018/041795
§ 371 (c)(1),
(2) Date: Mar. 20, 2020

(87) PCT Pub. No.: WO2019/060023
PCT Pub. Date: Mar. 28, 2019

(65) Prior Publication Data
US 2020/0218886 A1     Jul. 9, 2020

Related U.S. Application Data

(60) Provisional application No. 62/561,835, filed on Sep. 22, 2017.

(51) Int. Cl.
*G06K 9/00* (2022.01)
*H04N 5/232* (2006.01)
(Continued)

(52) U.S. Cl.
CPC ......... *G06K 9/00288* (2013.01); *G06F 21/32* (2013.01); *G06F 21/45* (2013.01);
(Continued)

(58) Field of Classification Search
CPC ........... G06K 9/00288; G06K 9/00208; G06K 9/00906; G06K 9/4604; G06K 9/00201;
(Continued)

(56) References Cited

U.S. PATENT DOCUMENTS 9,524,421 B2 *  12/2016  Ross .................. G06K 9/00288
2005/0063582 A1  3/2005  Park et al.
(Continued)

FOREIGN PATENT DOCUMENTS

WO    2016010720    1/2016

OTHER PUBLICATIONS

PCT/US2018/041795, "International Search Report and Written Opinion Received", dated Dec. 13, 2018, 13 pages.

*Primary Examiner* — John B Strege
(74) *Attorney, Agent, or Firm* — Kilpatrick Townsend & Stockton LLP

(57) ABSTRACT

Embodiments of the invention are directed to a system and methods for determining a likelihood that an image that includes a user is a spoof or fake. In some embodiments, focus values are determined for various parts of the image during a focus sweep. The focus values may represent a focus point at which a particular part of the image is sharp. In some embodiments, the focus values may be determined only for the sections of the image that correspond to a face within the image. From the focus values, the system may determine a relative depth of various parts of the image. Using the relative depths, the system may generate a rough depth map for the image. The depth map may be analyzed to determine a likelihood that the image is authentic.

17 Claims, 7 Drawing Sheets

(51) Int. Cl.
*G06F 21/32* (2013.01)
*G06F 21/45* (2013.01)
*G06K 9/46* (2006.01)

(52) U.S. Cl.
CPC ..... *G06K 9/00208* (2013.01); *G06K 9/00906* (2013.01); *G06K 9/4604* (2013.01); *H04N 5/23219* (2013.01); *H04N 5/23229* (2013.01); *H04N 5/232123* (2018.08)

(58) Field of Classification Search
CPC ......... H04N 5/232123; H04N 5/23219; H04N 5/23229; G06F 21/32; G06F 21/45
See application file for complete search history.

(56) References Cited

U.S. PATENT DOCUMENTS

| | | | |
|---|---|---|---|
| 2010/0002912 A1* | 1/2010 | Solinsky | G06K 9/00604 382/117 |
| 2013/0004082 A1* | 1/2013 | Kano | G06T 5/002 382/195 |
| 2013/0307933 A1 | 11/2013 | Znamenskiy et al. | |
| 2014/0307929 A1 | 10/2014 | Nechyba et al. | |
| 2015/0054978 A1* | 2/2015 | Shibagami | H04N 5/23212 348/222.1 |
| 2015/0170400 A1 | 6/2015 | Seitz et al. | |
| 2017/0124384 A1* | 5/2017 | Allyn | G06K 9/2018 |
| 2019/0011534 A1* | 1/2019 | Trotta | G06F 21/32 |
| 2019/0037128 A1* | 1/2019 | Wang | G06T 3/0068 |

\* cited by examiner

FACIAL ANTI-SPOOFING METHOD USING VARIANCES IN IMAGE PROPERTIES

CROSS-REFERENCE TO RELATED APPLICATIONS

The present application is a national-phase application under 35 U.S.C. 371 of International Application No. PCT/US2018/041795, filed Jul. 12, 2018, which claims priority to U.S. Patent Application No. 62/561,835, filed on Sep. 22, 2017, the disclosure of which is herein incorporated by reference in its entirety for all purposes.

BACKGROUND

As facial recognition techniques have become increasingly popular, more and more systems are beginning to employ these techniques. One of the challenging problems for a system that uses facial recognition is to determine whether the captured facial image is of a genuine user's face (live) or a two-dimensional (2D) replica. The replica of the user's face is sometimes called a "spoof," because it is being used to gain unauthorized access to a computer to obtain something. For example, a user may use a printed photo or replay of a 2D digital recording to attempt to trick a facial recognition system. This can be especially problematic when facial login can be used to access accounts or other resources belonging to a person. Although other sensors (e.g., depth sensors) can often be used to increase detection of spoofing attempts, most consumer grade devices (such as mobile phones) are often not equipped with these sensors.

Embodiments of the present invention address these problems and other problems, individually and collectively.

SUMMARY

Described herein are a system and techniques for enabling determination as to a likelihood that biometric information is authentic. In some embodiments, upon receiving a request for biometric authentication of a user that includes, for example, facial recognition, the system may determine a likelihood that collected biometric information is authentic. In some embodiments, this may involve performing a focus sweep by altering a focus distance of a camera device and determining at what focus distance each region of the collected biometric data is in focus. This may be used to identify potentially unauthentic biometric data without the use of additional sensors, such as depth sensors.

One embodiment of the invention is directed to a method comprising receiving an image of a user, the image including at least a portion of the user's face, determining, for each portion of multiple portions of the image covering the portion of the user's face, a focal length associated with the portion of the image, determining a relative difference in depth for each of the multiple portions of the image based on the focal length associated with each portion of the image, determining a level of contour for the portion of the user's face, and determining, based on the level of contour, a likelihood that the image of the user is an unauthentic image.

Another embodiment of the invention is directed to a user device, comprising: a processor; and a non-transitory computer-readable storage medium having code embodied thereon, the code being configured to cause the processor to: receive an image of a user, the image including at least a portion of the user's face, determine, for each portion of multiple portions of the image covering the portion of the user's face, a focus value associated with the portion of the image, determine a relative difference in depth for each of the multiple portions of the image based on the focus value associated with each portion of the image, determine a likelihood that the image of the user is an authentic image based on the relative difference in depth for each of the multiple portions of the image, and determine whether the likelihood that the image of the user is an authentic image is greater than a predetermined threshold.

Further details regarding embodiments of the invention can be found in the Detailed Description and the Figures.

BRIEF DESCRIPTION OF THE DRAWINGS

Various embodiments in accordance with the present disclosure will be described with reference to the drawings, in which.

DETAILED DESCRIPTION

Figure 1:
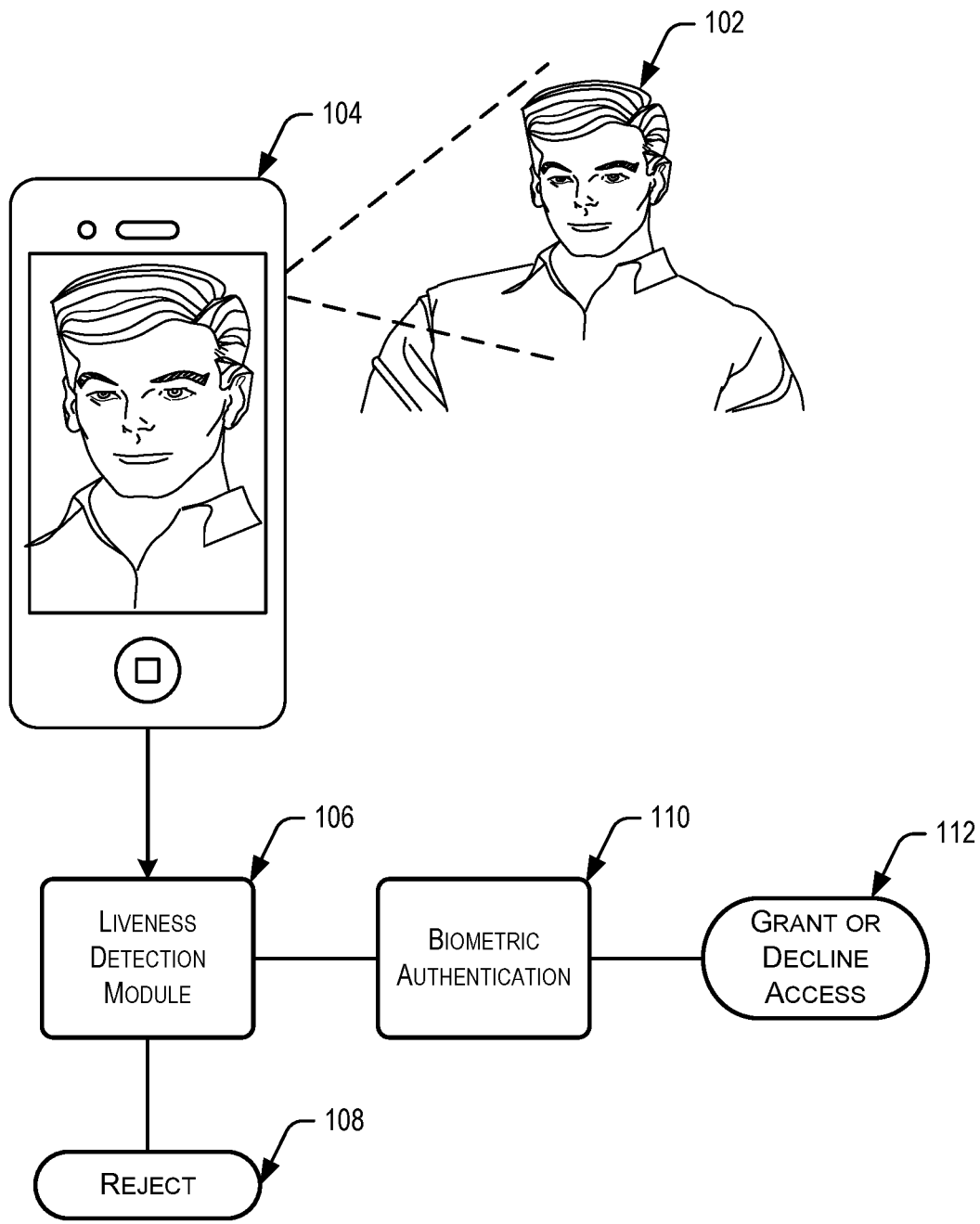
FIG. 1 depicts an illustrative example of a facial recognition system that uses one or more techniques in accordance with the processes described herein.

Prior to discussing specific embodiments of the invention, some terms may be described in detail.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "access request" may include a request for access to a resource. The resource may be physical resources (e.g., goods), digital resources (e.g., electronic document, electronic data, etc.), or services. In some cases, an access request may be submitted by transmission of an access request message that includes access request data. Typically, a device associated with a requestor may transmit the access request message to a device associated with a resource provider.

"Access request data" may include any suitable information surrounding or related to an access request. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

An "application program interface" or "API" may include software specifying how components of a system should interact. The API may comprise a set of routines, protocols, and tools on which software applications may be built. An API may be used for a web-based system, operating system, database system, computer hardware or software library, and may include specifications for routines, data structures, object classes, variables and/or remote calls.

"Authentication" may include a process for verifying an identity of something (e.g., a user). One form of authentication can be biometric authentication.

A "biometric" may be any physiological or behavioral characteristic that is unique to an individual. For example, a biometric may be a person's fingerprint, voice sample, face, DNA, iris, etc.

A "biometric certification token" may include data that indicates that a biometric sample or biometric template has been certified by a verification system. The biometric certification token may be in any suitable form. In some embodiments, the biometric certification token may be a biometric template that has been hashed and then signed using an encryption key of the verification system.

A "biometric reader" may include a device for capturing data from an individual's biometric sample. Examples of biometric readers may include fingerprint readers, front-facing cameras, microphones, and iris scanners.

A "biometric sample" or "biometric information" may include biometric data obtained by any type of input sensor. The data may be either an analog or digital representation of the user's biometric attributes, generated prior to determining distinct features needed for matching. For example, a biometric sample of a user's face may be image and/or depth data. In another example, a biometric sample of a user's voice may be audio data.

A "biometric template" or "biometric sample template" may include to a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

A "computing device" may be any suitable device that can receive and process data. Examples of computing devices may include access devices, transport computers, processing network computers, or authorization computers.

"Focus distance," usually represented in millimeters (mm), is a calculation of an optical distance from the point where light rays converge to form a sharp image of an object in a digital sensor in a camera device. Camera devices are often able to alter their current focus distance by repositioning lenses within the camera device. A camera device's ability to alter its focus distance is often referred to as a focus feature of the camera device.

A "focus sweep" is any process by which the focus distance of a camera device is altered with respect to time. In some embodiments, the focus distance may be adjusted from one end of the available focus distance spectrum to the other. For example, a focus sweep may involve altering the focus distance of a camera device by adjusting an available focus distance for that camera device from a minimum available focus distance to a maximum available focus distance over some given period of time. While performing a focus sweep, a user device may capture image information collected from the camera device at each focus distance (either continuously or at intervals) over that period of time. Various regions of the image information may then be compared to determine which regions are in or out of focus at each point in time.

A "focus value" for an image portion (or region) may refer to a focus distance at which that image portion is in focus (e.g., "sharp"). Different portions of an image may be assigned different focus values which are determined during a focus sweep. It should be noted that an image may refer to a series of images (such as a video). For example, a series of images may be captured during a focus sweep. Each portion of the image may be tracked throughout the series of images in order to identify a particular focus distance at which that portion of the image is sharpest. A focus value may then be assigned to that portion of the image based on the determined focus distance.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers.

A "service provider computer" may be a computer that provides a service to a user. Examples of service provider computers may include access devices such as POS terminals, processor computers operated by payment processing networks, issuer computers, computers that allow access to sensitive data, access terminals allowing access to sensitive locations, transmitting stations such as Bluetooth transmitting stations, computers that allow users to obtain certain services, etc.

The term "validation" may include the act of checking or affirming that information is legitimate. An example may be the act of checking that a digital signature appended to an electronic record is, in fact, legitimate and was signed by the entity that alleges creation of the digital signature. In some embodiments, digital signatures may be validated according to a verification algorithm in conjunction with a signing entity's public key. In other cases, if underlying data was signed using a symmetric key of a symmetric key pair, the signature can be validated with the corresponding symmetric key.

FIG. 1 depicts an illustrative example of a facial recognition system that uses one or more techniques in accordance with the processes described herein. In FIG. 1, a user 102 may wish to gain access to an account or other resource. In some embodiments, the account may be accessed using a login method that involves facial recognition. An image of the user 102 may be received along with a request for access.

In some embodiments, the system may use a mobile device 104. For example, an image of the user 102 may be captured using a camera of the mobile device and transmitted to a server for processing. In some embodiments, at least a portion of the functionality described herein may be executed via a mobile application installed upon the mobile device 104.

In accordance with at least some embodiments, the image may be processed by a liveness detection (anti-spoofing) module 106. The liveness detection module 106 may be any software module configured to perform at least a portion of the functionality described herein. In some embodiments, the liveness detection module 106 may be configured to determine a likelihood that the image of the user 102 is authentic. In the event that the liveness detection module 106 determines that the image is most likely fake, the liveness detection module 106 may cause the system to reject the image at 108, and deny access to the requested resource provided by the biometric system. In the event that the liveness detection module 106 determines that the image is most likely authentic, the image may be processed by a biometric authentication module 110. Access may then be granted or denied by the biometric authentication module 110.

Figure 2:
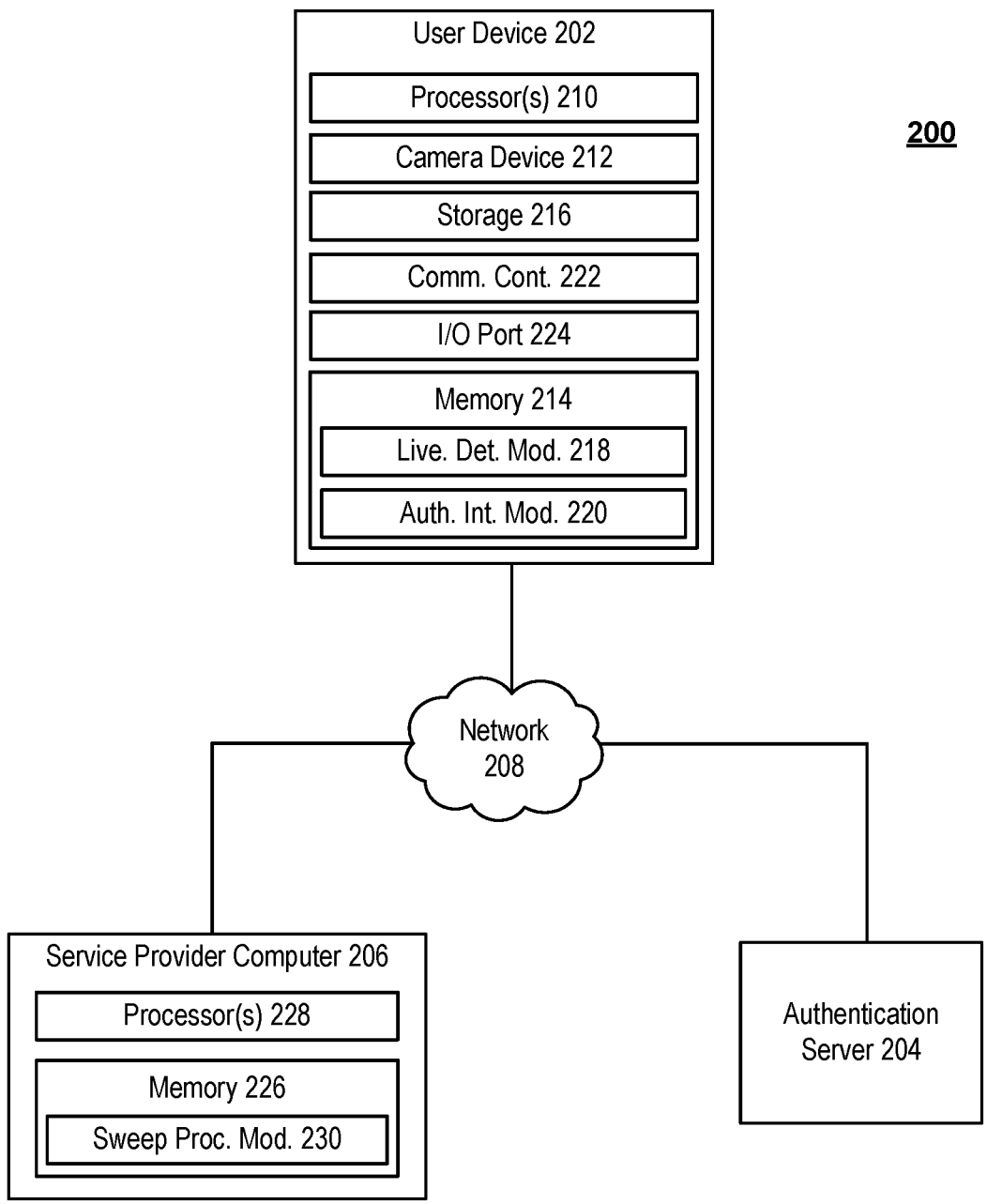
FIG. 2 depicts an illustrative example of a system or architecture 200 in which techniques for determining a likelihood as to whether biometric information for a person is a spoof may be implemented.

FIG. 2 depicts an illustrative example of a system or architecture 200 in which techniques for determining a likelihood as to whether biometric information for a person is a spoof may be implemented. In architecture 200, one or more consumers and/or users may utilize a user device 202. In some examples, the user device 202 may be in communication with an authentication server 204 and/or a service provider computer 206 via a network 208, or via other network connections.

The user devices 202 may be any type of computing device such as, but not limited to, a mobile phone, a smart phone, a personal digital assistant (PDA), a laptop computer, a desktop computer, a server computer, a thin-client device, a tablet PC, etc. The user device 202 may include one or more processors 210 capable of processing user input. The user device 202 may also include one or more input sensors, such as camera device 212, for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The camera device 212 may include an adjustable zoom feature. Embodiments of the application on the user device 202 may be stored and executed from its memory 214.

The memory 214 may store program instructions that are loadable and executable on the processor(s) 210, as well as data generated during the execution of these programs. Depending on the configuration and type of user device 202, the memory 214 may be volatile (such as random access memory (RAM)) and/or non-volatile (such as read-only memory (ROM), flash memory, etc.). The user device 202 may also include additional storage 216, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM) or ROM. Turning to the contents of the memory 214 in more detail, the memory 214 may include an operating system and one or more application programs or services for implementing the features disclosed herein including at least a module for determining a likelihood of authenticity of biometric information (liveness detection module 218) and/or a module for performing authentication of a user using the biometric information (authentication interface module 220).

In some embodiments, the liveness detection module 218 may comprise code that, when executed in conjunction with the processors 210, causes the user device to determine a likelihood of authenticity for biometric information. In some embodiments, this may involve performing a focus sweep to determine regions of the biometric information that are sharp at different focus levels. In some embodiments, the camera device 212 may be activated to collect biometric information for a user. The liveness detection module 218 may be configured to cause a zoom function of the camera device 212 to be activated while simultaneously collecting image information from that camera device 212. The liveness detection module 218 may then be configured to determine whether particular regions are in focus or out of focus while the zoom function is being activated. For example, the liveness detection module 218 may cause the zoom function of the camera device 212 to progress from a minimum level of zoom to a maximum level of zoom (or vice versa) and determine whether particular regions of the image information are sharp at each level of zoom. Upon detecting that particular regions are in focus at a particular levels of zoom, the liveness detection module 218 may, in conjunction with the processor(s) 210, be configured to determine whether the regions and their corresponding zoom levels match (or are at least within an acceptable range of) a predetermined region match pattern. For example, the user device 202 and/or the service provider computer 206 may store one or more patterns of region/zoom level mappings that correspond to authentic facial patterns. In this example, the regions of the current biometric information and their corresponding zoom levels may be compared to the authentic mappings of region/zoom level to determine the current biometric information's authenticity.

In some embodiments, the authentication interface module 220 may be configured, in conjunction with the processor(s) 210, to authenticate a user based upon collected biometric information. In some embodiments, the authentication interface module 220 may, in conjunction with the processor(s) 210, invoke the liveliness detection module 218 in order to determine the authenticity of biometric information before, during, or after the user is authenticated based on the biometric information. In some embodiments, authentication interface module 220 may, in conjunction with the processor(s) cause the user device 202 to transmit collected biometric information to an authentication server 204, which may then perform the authentication.

The memory 214 and the additional storage 216, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 202 or the service provider computer 206. The user device 202 may also contain communications connection(s) 222 that allow the user device 202 to communicate with a stored database, another computing device or server, user terminals, and/or other devices on the network 208. The user device 202 may also include input/output (I/O) device(s) and/or ports 224, such as for enabling connection with a keyboard, a mouse, a pen, a voice input device, a touch input device, a display, speakers, a printer, etc.

In some examples, the network 208 may include any one or a combination of many different types of networks, such as cable networks, the Internet, wireless networks, cellular networks, and other private and/or public networks. It is noted that the described techniques may apply in other client/server arrangements (e.g., set-top boxes, etc.), as well as in non-client/server arrangements (e.g., locally stored applications, peer to-peer systems, etc.).

The authentication server 204 and/or service provider computer 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, one or both of the depicted computing devices may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment. In some embodiments, the service provider computer 206 and the authentication server 204 may be the same computing device.

In one illustrative configuration, the service provider computer 206 may include at least one memory 226 and one or more processing units (or processors) 228. The processor(s) 228 may be implemented as appropriate in hardware, computer-executable instructions, firmware or combinations thereof. Computer-executable instruction or firmware implementations of the processor(s) 228 may include computer-executable or machine executable instructions written in any suitable programming language to perform the various functions described.

Turning to the contents of the memory 226 in more detail, the memory 226 may include a sweep processing module 230 that, when used in conjunction with the processor(s) 228, is capable of processing focus sweep information received from the liveliness detection module 218. Although sample architecture 200 depicts liveliness detection module 218 as being included in the contents of the memory 226 of the user device 202, some embodiments may not include a liveliness detection module 218 in memory 226 of the user device 202. In those embodiments in which the liveliness detection module 218 is not included in memory 214, input received by the camera device 212 may instead be processed by the service provider computer 206.

Figure 3:
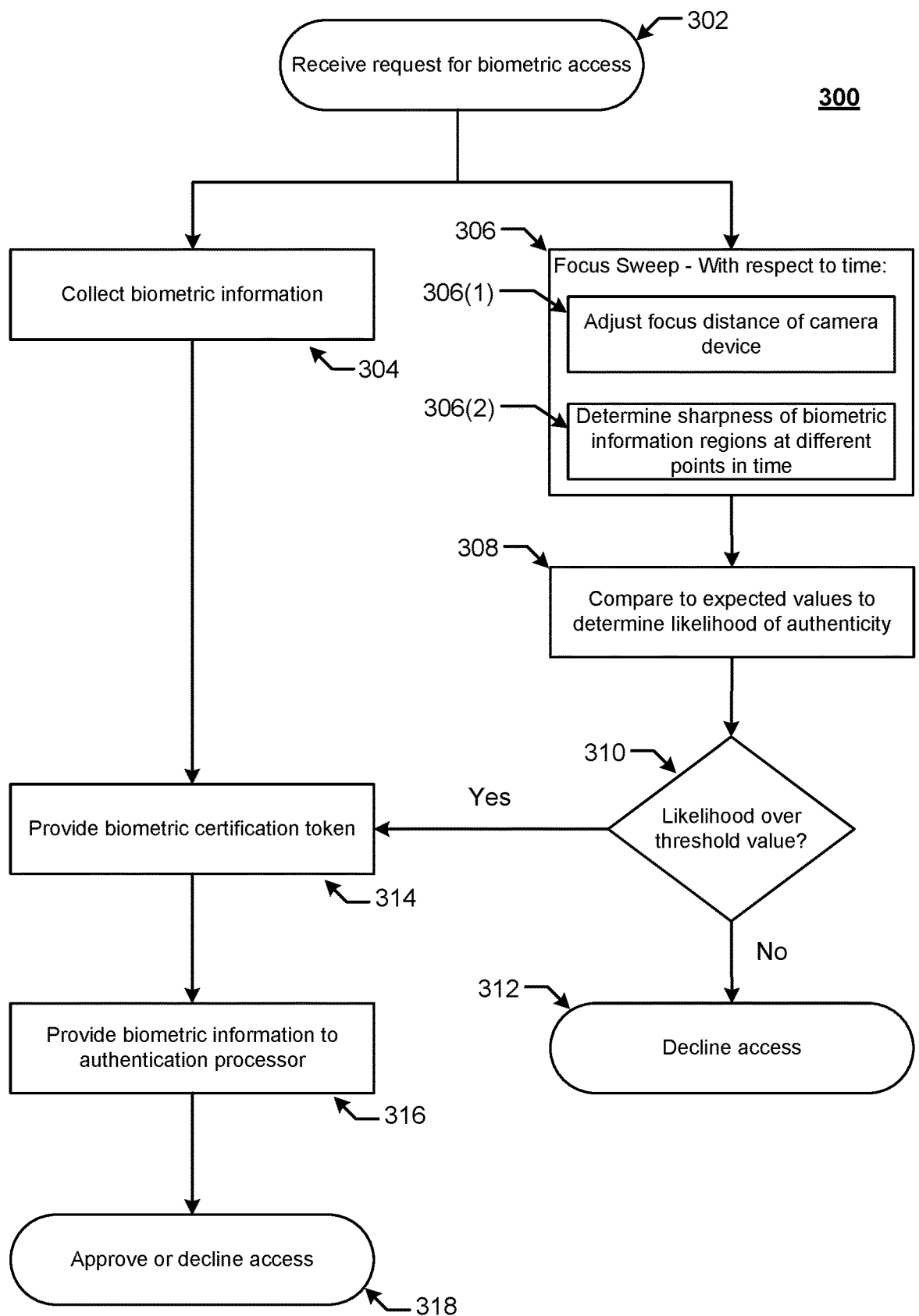
FIG. 3 depicts a flow chart illustrating an example process for enabling biometric access in accordance with at least some embodiments.

FIG. 3 depicts a flow chart illustrating an example process for enabling biometric access in accordance with at least some embodiments. The process 300, or at least portions thereof, may be performed by some combination of an example user device 202 and service provider computer 206 as depicted in FIG. 2 and described above.

Process 300 may begin at 302, when a request is received for access to some resource and where that access requires biometric authentication. For example, the request may be a request to log into a user device or an account accessed via the user device using facial recognition. In some embodiments, the process may be initiated upon execution of a liveliness detection module. For example, upon execution of an authentication interface module on a user device, that authentication interface module may, in turn, cause the liveliness detection module to be executed.

At 304, the process 300 may involve collecting biometric information to be used in a biometric authentication process. A biometric authentication process may involve collecting biometric information for a user (e.g., an image of the user's face) and comparing that biometric information to biometric information stored with respect to that specific user. An authentication process is typically successful if the collected biometric information matches (or is within some predetermined range of) the biometric information stored for the user. It should be noted that step 304 may be performed before, after, or concurrently with step 306. For example, the biometric information collected may be collected during a focus sweep performed by the camera device. Alternatively, the biometric information may be collected immediately preceding or immediately subsequent to, performing a focus sweep.

At 306, the process 300 may involve performing a focus sweep. This may involve, over some period of time, adjusting a focus distance of the camera device at step 306(1) and determining regions of the biometric information that are sharp at particular focus distances at 306(2). It should be noted steps 306(1) and 306(2) may be performed concurrently.

At 306(1), the subprocess 306 may involve adjusting a focus distance of the camera device. This may involve moving or otherwise adjusting the position of one or more lenses within the camera device. In some embodiments, the focus distance of the camera device may be adjusted over some predetermined period of time. It should be noted that the predetermined period of time may be relatively short in order to minimize movement of the user in the image or the user device during the focus sweep. For example, the predetermined period of time may be mere milliseconds.

At 306(2), the subprocess 306 may involve determining one or more regions of the biometric information which are sharp (e.g., in focus). This may involve identifying regions of the image information within which various features display little or no distortion or blur. A region of the image information may be any two-dimensional area that forms a portion of the image information. One image may include any number of regions. In some embodiments, obtaining the focus distances of two image portions may be sufficient, while in other embodiments, it may be desirable to obtain the focus distances of more than two image portions (e.g., at least 3, 5, 10, or 100) of an image.

It should be noted that image information may be captured as described in step 306(2) throughout the performance of the focus sweep in step 306(1). In some embodiments, the image information may be captured continuously (e.g., as a video) throughout the focus sweep and processed to identify focus values (or time frames) at which particular regions are sharp. In some embodiments, the image information may be captured in intervals. For example, the image information may be captured at predetermined intervals throughout the focus sweep. Processing of the image information to determine sharpness may be performed either locally by the user device or remotely by a service provider computer providing support for the user device.

At 308, the process 300 may involve comparing the determined focus values to expected values in order to determine a likelihood of authenticity (or a likelihood of unauthenticity) for the image information. In some embodiments, the expected values may include some range of variance in focus values. For example, it may be expected that the focus values for two different regions of the image information should vary by at least some minimum value. If the focus values for those two regions vary by less than that minimum value, then it can be assumed that the image is flatter than it should be and may be a printout or 2D image (hence likely unauthentic). In some embodiments, the system may identify particular regions from the image information and compare focus values for those regions. For example, the system may identify a region of the image information which represents a tip of the user's nose as well as a region of the image information which represents a user's cheek. The process 300 may then determine whether the difference in focus values for each of those regions are too close, within an acceptable range, or too far. In other words, the process 300 may involve determining a level of "contour" for the image based on the variances between focus values for each region in the image. The process may then involve identifying a likelihood of authenticity based on those focus values. In some embodiments, the likelihood of authenticity may positively correlate to the difference in focus values when the difference in focus values is below some threshold and may inversely correlate to the difference in focus values when the difference in focus values is above that threshold. The opposite may be true when determining a likelihood of unauthenticity. In some embodiments, the likelihood of authenticity may account for user-specific biometric data. For example, an expected difference in focus values may be based upon actual data maintained for that user. In this example, a level of contour for the image may be compared to a level of contour associated with the user (e.g., an extent to which the user's facial features are relatively flat). In some embodiments, the expected difference in focus values may be generic, or otherwise applied to most cases. In some embodiments, expected differences in focus values may scale based on the sizes of various regions (indicating a smaller or larger face).

At 310, the process 300 may involve determining whether the likelihood of authenticity (e.g., an authenticity value) exceeds some predetermined threshold value. In some embodiments, the authenticity value may be a score that is calculated based upon the expected focus lengths of the different regions of a capture image as compared to the actual captured focus distances. For example, a user's face may have three regions including the user's forehead, nose, and chin respectively. After performing a focus sweep in a registration process, these may have expected relative values of 1, 2, and 1 since the nose has a higher profile than the chin and forehead which may have a profile lying within the same plane. A captured image of the user's face at the time of an access request may determine actual relative values of 1, 2, and 1 during a focus sweep by the access device. If a two-dimensional picture is used to by an unauthorized person to impersonate and spoof the access device that is able to grant access, the focus sweep by the access device may produce relative values of 1, 1, and 1, since the two-dimensional image is flat. An example threshold may be 0.5, such that the total difference in relative values should not exceed 0.5. For instance, in the above example, the differences between the expected values and the captured values for the authentic user would be zero, since the values 1, 2, 1 are respectively subtracted from the captured values 1, 2, 1. In the case of the unauthentic image, the authentication value would be 1, which would be greater than 0.5 (i.e., 1−1=0, 2−1=1, and 1−1=0). Other ways can also be used to determine the likelihood of authenticity. For example, in some embodiments, a comparison with a prior authentic image of the user may not be needed. For example, if the focus length at all regions of the captured image are the same, then this alone may indicate that the captured image was from a two dimensional image as opposed to a three-dimensional profile of an authentic user.

In some embodiments, the predetermined threshold value may be set for all authentication processes. In some embodiments, the threshold value may vary based on the authentication process being used or the entity performing the authentication process. For example, one entity may require that the likelihood of authenticity for the collected image information be at least 95% whereas a second entity may require that the likelihood of authenticity for the collected image information only be at least 80%.

At 312, the process 300 may involve declining access to the requested resource upon determining that the likelihood of authenticity for the image information is below the threshold value. It should be noted that access may be declined independent of whether the authentication process has been passed or even performed.

At 314, the process 300 may involve providing or generating a biometric certification token upon determining that the likelihood of authenticity for the image information is greater than or equal to the threshold value. In some embodiments, this may involve signing the biometric information collected at step 304 or some derivative thereof (e.g., a biometric template derived from the biometric information). For example, the biometric certification token may be a biometric template that has been hashed and then signed using an encryption key of the verification system.

At 316, the process 300 may involve providing the biometric information collected at step 304 to an authentication processor for authentication of the user. It should be noted that the authentication processor may be a separate entity from the user device and service provider described herein. For example, the authentication processor may be an example of authentication server 204 depicted in FIG. 2. Upon receiving an indication as to whether or not the authentication process is successful, access to the requested resource may be approved or declined at 318.

In some embodiments, the requested resource may be access to an account to conduct a payment transaction. The machine that may perform the process 300 may be an access device such as a POS terminal or another device in communication with the access device. Once the access device determines that the captured image is a real image of a real person and is not a two-dimensional spoof image the POS terminal can generate an authorization request message for a payment transaction. The authorization request message may be transmitted to an authorization computer (e.g., an issuer computer) via a transport computer (e.g., an acquirer computer) and a processor computer (e.g., a computer in a payment processing network). The authorization computer can approve of the payment transaction, and generate and return an authorization response message to the access device through the processor computer and the transport computer. At the end of the day or some other period of time, a settlement process can occur between the transport computer, the processor computer, and the authorization computer.

Figure 4:
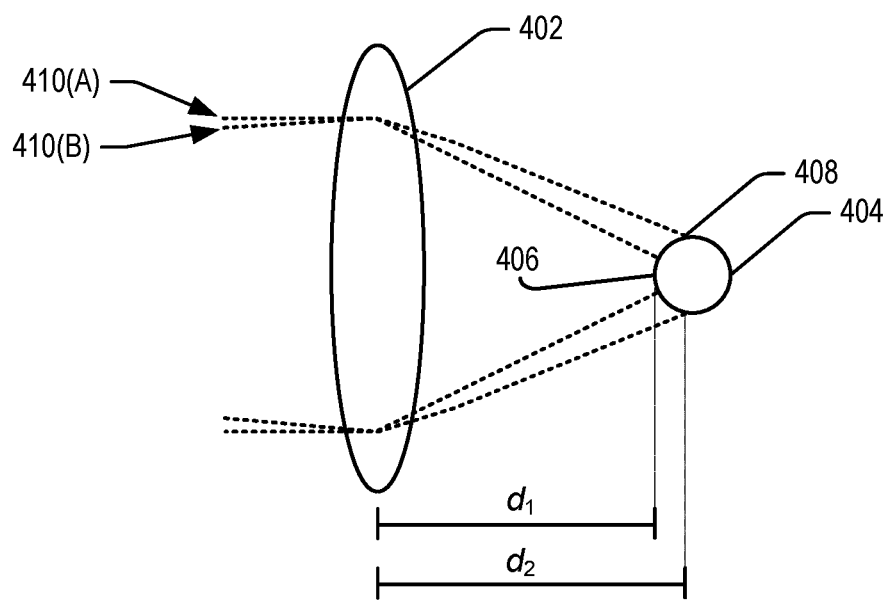
FIG. 4 provides an illustrative example of various optical properties as well as a method of approximating a contour of an object using those optical properties in accordance with at least some embodiments.

FIG. 4 provides an illustrative example of various optical properties as well as a method of approximating a contour of an object using those optical properties in accordance with at least some embodiments. In FIG. 4, a lens 402 is depicted which may belong to a camera device. The lens 402 is positioned with respect to an object 404, such as to capture an image of the object 404.

With respect to a camera device, a field of view for a camera device can be altered by adjusting a level of zoom for the camera device. There are primarily two separate methods of performing a zoom function for a camera device: digital zoom and optical zoom.

Digital zoom is a method of decreasing the apparent angle of view of a digital photographic or video image. Digital zoom is accomplished by cropping a field of view to a centered area with the same aspect ratio as the original. This may also involve interpolating the result back up to the pixel dimensions of the original. Digital zoom is accomplished electronically, with no adjustment of the camera's optics, and no optical resolution is gained in the process.

Optical zoom, which may require the use of a zoom lens, is a method of decreasing the angle of view (AOV) of the camera device by moving one or more lenses of the camera device to achieve a particular focal length. Focal length, usually represented in millimeters (mm), is a calculation of an optical distance from the point where light rays converge to form a sharp image of an object in a digital sensor in the camera device. During an optical zoom process, one or more lenses 402 within the camera device are repositioned, altering the focus of the camera, in order to adjust the field of view.

In some embodiments, a camera may have an auto-zoom function, in which the camera adjusts its focus automatically (e.g., without human intervention) to achieve a particular contrast within a captured image. An appropriate focus value for an object depends upon a distance between the lens 402 and the object 404. Accordingly, when an object 404 has sides that slope away from the camera lens 402, not every area of the object 404 will be in focus. For example, consider a scenario in which a focus value is selected to sharply capture point 406 at distance d1 from the lens. In this scenario, an image of the object at point 408 at distance d2 from the lens will not be entirely in focus. Depth of field (DOF) (also called focus range or effective focus range) is the distance between the nearest and farthest objects in a scene that appear acceptably sharp in an image. Although a lens can precisely focus at only one distance at a time, the decrease in sharpness is gradual on each side of the focused distance, so that within the DOF, the unsharpness may be imperceptible to a person under normal viewing conditions.

In accordance with at least some embodiments, portions of an image that are out of focus can be detected based on a sharpness of the image within that portion. For example, when an image, or portion of an image, is not in focus, light rays originating at the out of focus point will not converge at the digital sensor, resulting in an image which is not as sharp as that of a portion of the object that is in focus. By way of illustration, light rays 410 (A and B) depict light rays that originate at points 406 and 408. As can be seen in the illustration, light rays 410 A and B diverge slightly, which results in a blurring pattern around at least one of the image portions. Accordingly, when the point at 406 is in focus, the point 408 will be out of focus. Likewise, when the point at 408 is in focus, the point 406 will be out of focus. By performing a focus sweep, in which the focus distance is altered with respect to time, the system can detect which points are sharp as the focus value is changed.

In accordance with at least some embodiments, a system may generate a rough depth map of an object using the optical properties described above. In some embodiments, the system may cause a camera device to perform a focus sweep when capturing an image of a user. The system may then determine, for multiple portions of the image, sharpness information with respect to various focus values. In particular, the system may determine which sections of an image are sharp, or in focus, for any given focus value during the focus sweep. Methods for determining sharpness information for a portion of an image are described in greater detail elsewhere. Based on the determined sharpness information, the system may determine a difference in distance between the object in each portion of the image and the object in a different portion of the image. This can be used to determine a depth of the image for a portion of the image relative to other portions of the image. The system may then determine contour from the depth map. For example, in the case that the depth does not vary across the image, it may be determined that the object is very flat. In some embodiments, a high degree of contour may be an indication that the object depicted within the image is actually a photograph or other two dimensional depiction of a face rather than an actual face.

Figure 5:
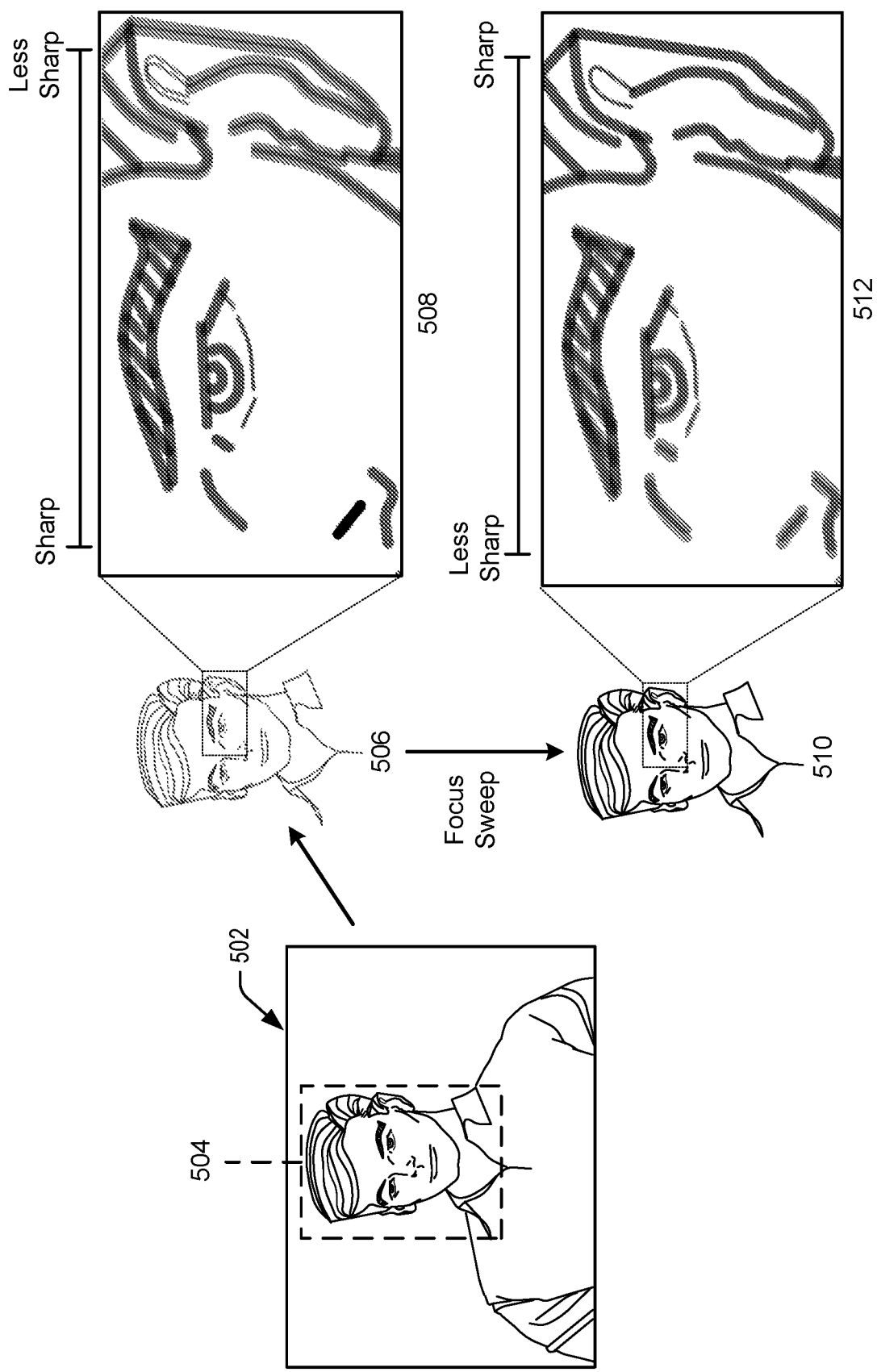
FIG. 5 depicts an illustrative example of a process for determining a likelihood that an image of a person is a spoof image in accordance with at least some embodiments.

FIG. 5 depicts an illustrative example of a process for determining a likelihood that an image of a person is a spoofed image in accordance with at least some embodiments. In FIG. 5, an image 502 may be received by the system that depicts at least a portion of a user. In some embodiments, the system may use one or more machine vision techniques to detect a face 504 within the image 502. For example, the system may use facial landmark extraction to identify facial landmarks (e.g., tip of a nose, corners of eyes, etc.). In some embodiments, the system may process only the portion of the image containing the face 504 in order to reduce the amount of processing needed.

In FIG. 5, processing of the image 502 may result in a coarse determination of relative depth within the image. In a first focus position 506, one side of the image may be determined to be sharper than the other side of the image at a first point in time during the focus sweep. For example, a section 508 of the image 502 is blown up to show that the right side of the image (the side furthest from the center of the face) is less sharp than the left side of the image at the first point in time of the focus sweep.

During a focus sweep from the first focus sweep position 506 to a second focus 510, the sharpness of the image 502 may change. For example, a section 512 of the image 502 is blown up to show that the left side of the image (the side closest to the center of the face) is less sharp than the right side of the image at a second point in time during the focus sweep.

This depicted change in sharpness with respect to time may indicate that the right side of the image depicts an object that is deeper, or has a greater depth than, the object in the left side of the image. This would result in a depth map being created that shows that the face slopes away from the focal point toward the right side of the image. This would appear to be consistent with an image of an actual face. The system may then determine that the image 502 is likely to be real. It should be noted that the reduction in sharpness, or blur, illustrated in blow up section 508 and blow up section 510 has been exaggerated in order to better illustrate certain concepts of the disclosure. In some cases, the difference in sharpness may not be perceptible by the human eye.

In a first scenario, the sharpness of the image may be determined to change throughout the image as a focus sweep is performed as described above. As pointed out, this may indicate the presence of an actual face. In a second scenario, the sharpness of the image may be relatively equal, in that the difference in focus values needed to bring each section of the image into focus is relatively small. This would indicate that each section of the image has a relatively equal depth. This would appear to be inconsistent with an image of an actual face as it indicates that the face is flat. Because most faces are not flat, the system may determine that the image in the second scenario is likely fake.

Alternatively, some sections of the image may remain out of focus regardless of the range of focus values. In this scenario, it is likely that the image is one of a 2D printout or photograph, since such a 2D printout would capture a distinction in sharpness across the image. For example, if a photograph is taken of a person's face, then the photograph will depict some portions of the image as being sharper than others based on the focus values of the camera used to capture the image. In this scenario, when performing a focus sweep, the portions of the image which are less sharp will remain less sharp throughout the sweep. Accordingly, this may indicate a spoof image.

Figure 6:
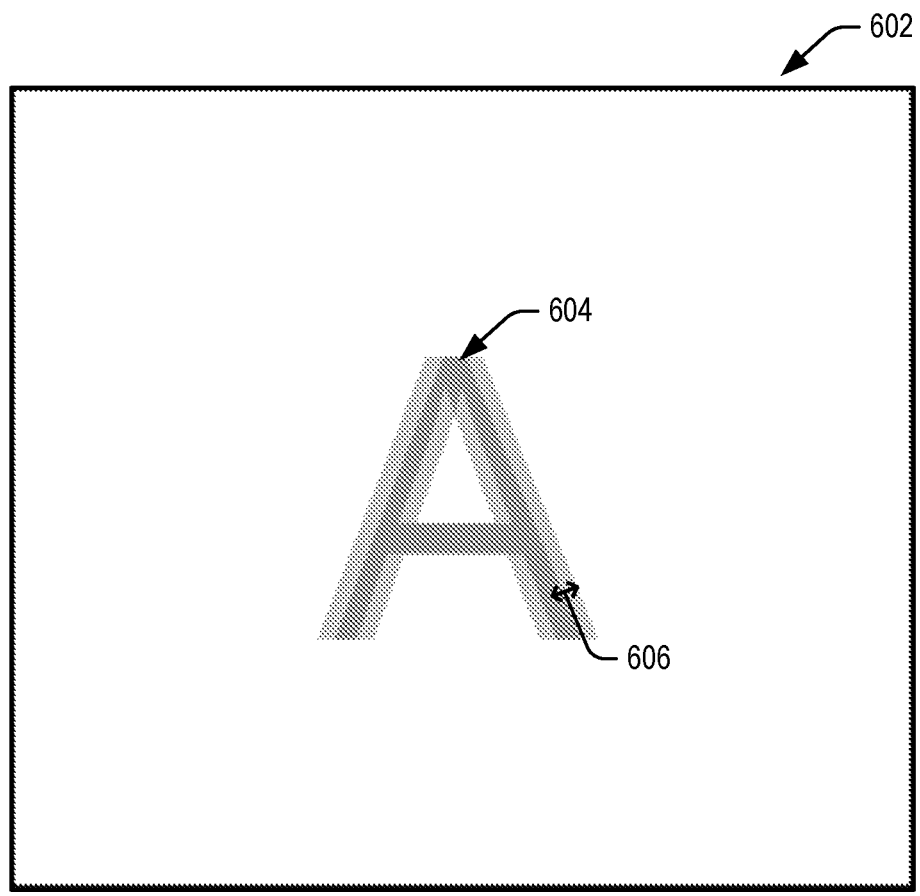
FIG. 6 illustrates an example approach for determining a sharpness for an image or a portion of an image in accordance with embodiments of the disclosure.

FIG. 6 illustrates an example approach for determining a sharpness for an image or a portion of an image in accordance with embodiments of the disclosure. FIG. 6 depicts an image 602 that may be collected with respect to an object 604 or a portion of an object 604.

A number of techniques may be used to calculate a sharpness of an image of object 604 or a portion of object 604 within image 602. Sharpness may represent a measure of how clearly an image's features (e.g., edges) are defined and may be calculated using the boundaries between zones of different tones or colors within an image. For example, sharpness may represent an amount to which an edge of an object blurs into its surroundings in an image. In some embodiments, more blur may be represented by a more gradual shift between tone or color boundaries.

One way to measure sharpness is to use the rise distance of the edge of the object 604, for example, the distance (in pixels, millimeters, or fraction of image height) for the pixel level to go from 10% to 90% of its final value. This is typically called the 10-90% rise distance. In this manner, a rise distance may be calculated as a quantitative value of sharpness, where a higher rise distance represents a lower sharpness value. For example, pixels along a line 606 leading from an outer edge of an object 604 (or portion of an object) to an interior of the object 604 (or portion of the object) may be sampled. The outer edge may be identified as the first pixel to include a tone or color associated with the object 604. Moving inward along 606, a color and/or tone value for each pixel may be measured until no further changes (or no further substantial changes) are detected. The distance between the point on line 606 at which no further changes are detected moving inward and the point on line 606 at which the outer edge is detected is the rise distance.

A second technique for measuring sharpness is to measure a variance, or delta, between an image of the object 604 and what the image of the object should look like. In this technique, one or more object recognition techniques may be used to identify the type of object depicted in the image 602. The Once the type of object has been identified, an expected image may be identified (e.g., from an image database) associated with that image. For example, the system may identify an image of a human ear. In this example, images of a typical human ear may be retrieved from an image database and compared to the image 602. A sharpness of the image 602 may then be calculated as a variance between the image 602 and the retrieved expected image.

It should be noted that FIG. 6 provides only some example techniques for determining a sharpness for an image of an object 604 or portion of an object within an image 602. One skilled in the art would recognize that a number of equivalent techniques may be available. The description provided with respect to FIG. 6 is not meant to limit the use of techniques to those described.

Figure 7:
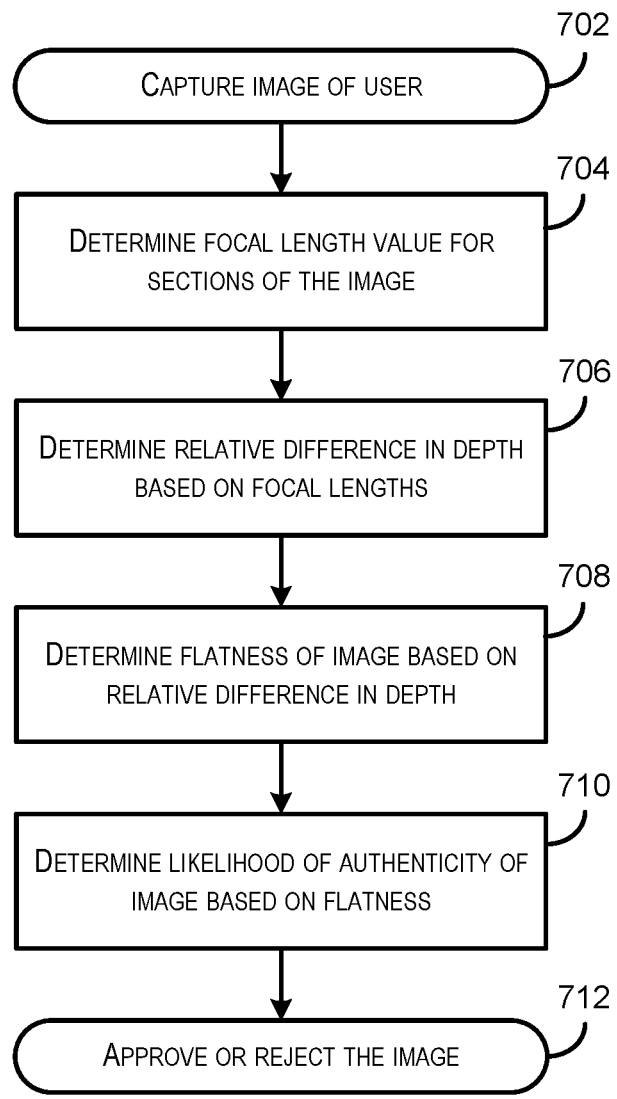
FIG. 7 depicts a flow diagram depicting a process for determining a likelihood as to whether an image of a person is, or is not, a spoof in accordance with at least some embodiments.

FIG. 7 depicts a flow diagram depicting a process for determining a likelihood as to whether an image of a person is, or is not, a spoof in accordance with at least some embodiments. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications). The code may be stored on a computer-readable storage medium, for example, in the form of a computer program including a plurality of instructions executable by one or more processors. The computer-readable storage medium may be non-transitory.

The process 700 may begin at 702, when the system captures an image of a user. In some embodiments, the image may be captured in connection with an access request. For example, the user may request access to an account or resource owned by, or maintained with respect to, the user. The image may include at least a portion of the user's face. In some embodiments, one or more machine vision techniques may be used to detect the location of the user's face within the image. In some embodiments, capturing an image of the user may involve performing a focus sweep during the image capture. In the focus sweep, the focus values of the camera are adjusted over time such that different sections of the image may be in focus at different times. In some embodiments, the user may enroll in the system described herein by submitting a request for enrollment. During an enrollment process, the system may learn (using techniques described herein) facial features and/or depth characteristics of the user when an image is captured of that user. In future authentication processes, the depth information generated using the described process may be compared to the depth information collected during the enrollment process.

At 704, the system may identify a focus values to be associated with various sections of the received image. In some embodiments, the system may identify focus values for only sections of the image that correspond to the image of the user's face. To do this, the system may assign a focus value to each section of the image by determining at what focus value the image is sharp. Various techniques for determining a level of sharpness are described above with respect to FIG. 6. For example, in some embodiments, the system may identify an object in the image and compare the image of that object to other images of that object. By way of illustration, if the system identifies (e.g., using facial landmark extraction or other suitable image processing techniques) an image of an ear depicted in the image, then the system may compare that image to other images of the user's ears to determine a level of sharpness for the ear in the received image.

At 706, the system may identify a relative difference in depth between various sections of the image based on focus values associated with each section of the image. For example, sections of the image that appear to be in focus (e.g., sharp) at higher focus values are likely to be either deeper or shallower than sections of the image that appear to be in focus at lower focus values. In some embodiments, the system may approximate an amount of difference in depth between two points of an image based on the difference in focus values associated with those two points. Using this method, the system may generate a rough depth map (e.g., range map) for the image.

At 708, the system may determine a level of contour for the image based on the depth map generated at 706. In some embodiments, the image may be considered "flat" if a variance in depths across the depth map does not exceed a predetermined threshold value.

At 710, the system may calculate a likelihood that the image is a spoof, or fake, based on the contour of the image. In some embodiments, a level of contour for a particular image may be compared to a level of contour associated with a particular user. For example, the system may maintain a depth map or contour information for each user for which it maintains an account. Upon detecting that a particular user is attempting to log into an account, or otherwise access a resource, using facial recognition techniques, the system may determine a level of contour for the image and may compare that level of contour to the contour information stored with respect to that user. Accordingly, the system may be able to account for some users that may have faces that are flatter than others. In some embodiments, the system may determine that any contour value over a threshold level of contour is likely to be a spoof.

At 712, the system may approve or reject the image based on the determined likelihood that the image is a spoof. In some embodiments, upon determining that the image is not likely a spoof, the system may further process the image. For example, once the image is determined not to be a spoof, the system may perform facial analysis to determine the identity of the user in the image.

It should be noted that several technical advantages are provided by embodiments of the disclosure. For example, the system enables determination as to the likelihood of a spoof login attempt using commonly available materials (e.g., using only a camera device). Typically, user devices are able to identify spoofed login attempts (e.g., users trying to log in using a picture of the actual user) by using depth information (e.g., ensuring that the variances in depth match expected values). However, this functionality is not typically available to user devices that do not include only a camera device and no depth sensor. Hence, access techniques that involve facial recognition are usually not available on such devices. The current system enables user devices with only camera devices to detect these unauthentic face scans. In other words, the system described herein allows spoof analysis to be performed without the addition of depth sensors or other sensing devices. These additional systems are often expensive and may not be readily available.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   receiving an image of a user, the image including at least a portion of the user's face;
   determining, for each portion of multiple portions of the image covering the portion of the user's face, a focus value associated with the portion of the image;
   determining a relative difference in depth for each of the multiple portions of the image based on the focus value associated with each portion of the image;
   determining a level of contour for the portion of the user's face; and determining, based on the level of contour, a likelihood that the image of the user is an unauthentic image, wherein determining the focus value for each portion of multiple portions of the image comprises altering a depth of field with respect to time and identifying the focus value at which the portion of the image is sharp.

2. A method comprising:

receiving an image of a user, the image including at least a portion of the user's face;

determining, for each portion of multiple portions of the image covering the portion of the user's face, a focus value associated with the portion of the image;

determining a relative difference in depth for each of the multiple portions of the image based on the focus value associated with each portion of the image;

determining a level of contour for the portion of the user's face; and determining, based on the level of contour, a likelihood that the image of the user is an unauthentic image, wherein the image includes information on a variation in focus value with respect to time, and wherein the focus value associated with each portion of multiple portions of the image comprises a value at which the portion of the image is sharp.

3. The method of claim 1, wherein determining the likelihood that the image of the user is an unauthentic image comprises comparing the level of contour to a contour level associated with the user.

4. The method of claim 1, further comprising causing a facial recognition system to reject the image if the likelihood that the image of the user is an unauthentic image exceeds a predetermined threshold value.

5. The method of claim 1, further comprising causing a facial recognition system to perform facial recognition upon the image if the likelihood that the image of the user is an unauthentic image does not exceed a predetermined threshold value.

6. The method of claim 1, wherein determining a level of sharpness associated with a portion of the image comprises comparing the portion of the image to similar images.

7. The method of claim 1, wherein determining, based on the level of contour, the likelihood that the image of the user is an unauthentic image comprises determining whether the level of contour exceeds a threshold level of contour value.

8. A computing device, comprising:

a processor; and a non-transitory computer-readable storage medium having code embodied thereon, the code being configured to cause the processor to:

receive an image of a user, the image including at least a portion of the user's face;

determine, for each portion of multiple portions of the image covering the portion of the user's face, a focus value associated with the portion of the image;

determine a relative difference in depth for each of the multiple portions of the image based on the focus value associated with each portion of the image;

determine a likelihood that the image of the user is an authentic image based on the relative difference in depth for each of the multiple portions of the image; and determine whether the likelihood that the image of the user is an authentic image is greater than a predetermined threshold, wherein the focus value comprises a focus distance at which the portion of the image is sharp.

9. The computing device of claim 8, wherein the image of the user is received with respect to a request for access to a resource.

10. The computing device of claim 9, further comprising upon determining that the likelihood that the image of the user is an authentic image is less than the predetermined threshold, declining access to the resource.

11. The computing device of claim 9, further comprising upon determining that the likelihood that the image of the user is an authentic image is greater than or equal to the predetermined threshold, providing the image of the user to an authentication processor.

12. The computing device of claim 11, wherein the predetermined threshold is determined based upon the authentication processor.

13. The computing device of claim 8, wherein the likelihood that the image of the user is an authentic image is determined by comparing the relative difference in depth for each of the multiple portions of the image to expected values.

14. The computing device of claim 8, wherein determining a focus value associated with a portion of the image comprises performing a focus sweep.

15. The computing device of claim 8, wherein the likelihood that the image of the user is an authentic image positively correlates to a difference in focus values between two or more portions of the image.

16. The computing device of claim 8, wherein the computing device is a mobile device.

17. The computing device of claim 16, wherein determining a focus value associated with a portion of the image comprises providing the portion of the image to a service provider computer and receiving the focus value from the service provider computer.

* * * * *